United States Patent [19]
Collins

[11] 3,945,784
[45] Mar. 23, 1976

[54] INJECTION MOULDING MACHINERY
[75] Inventor: Thomas Robert Stephen Collins, Letchworth, England
[73] Assignee: Imperial Chemical Industries Limited, London, England
[22] Filed: Jan. 18, 1974
[21] Appl. No.: 434,641

[52] U.S. Cl.......... 425/130; 425/245 R; 425/817 R; 425/DIG. 225
[51] Int. Cl.²............................................. B29F 1/05
[58] Field of Search........... 425/130, 245, DIG. 224, 425/DIG. 225, 817 R; 137/111, 114

[56] References Cited
UNITED STATES PATENTS

| | | | |
|---|---|---|---|
| 2,371,293 | 3/1945 | Hoof | 137/113 |
| 3,008,482 | 11/1961 | Hunter | 137/113 |
| 3,690,797 | 9/1972 | Garner | 425/245 X |
| 3,733,156 | 5/1973 | Garner | 425/132 |

*Primary Examiner*—R. J. Shore
*Assistant Examiner*—Carl Rowold
*Attorney, Agent, or Firm*—Cushman, Darby & Cushman

[57] ABSTRACT

A shuttle is mounted in a passage connecting ducts from injection barrels. An outlet in the passage wall connects to a common sprue channel. The shuttle isolates one duct from the opening at each end of its travel but at no time blocks the opening. The shuttle is preferably a ball and is preferably located in the spigot of a shut-off tap.

5 Claims, 6 Drawing Figures

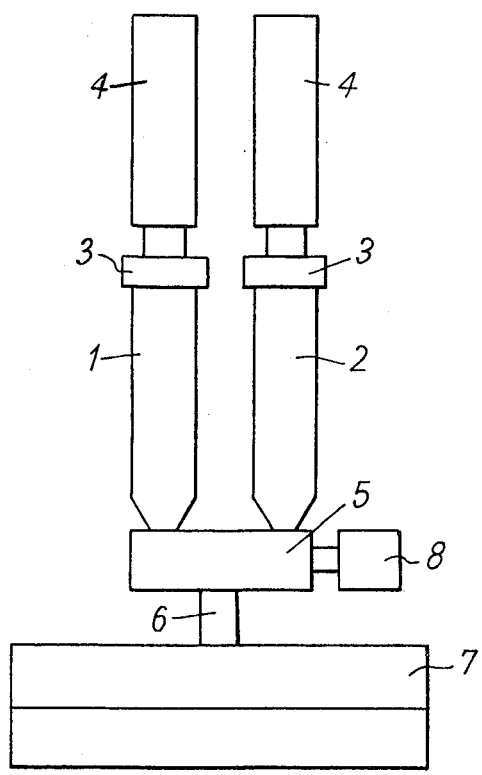
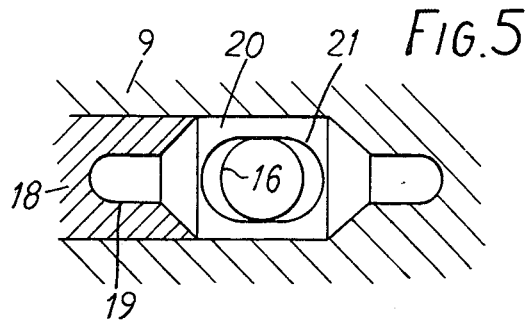

INJECTION MOULDING MACHINERY

This invention relates to injection moulding machinery and in particular to an injection unit for injecting plastic materials sequentially into a mould cavity from separate sources.

By injecting plastic materials sequentially into a mould cavity from separate sources, articles may be formed having a skin of the material first injected enclosing a core of the second injected material.

Various embodiments of this process and machinery suitable therefor are described in, inter alia, our British Patent Specification Nos. 1,156,217, 1,219,097 and 1,255,970.

In order to achieve rapid moulding cycles it is desirable that the walls of the mould cavity into which the materials are injected are maintained at such a temperature as to enhance solidification of the synthetic resin material. The mould temperatures are conveniently those utilised for the conventional injection moulding of the skin material, or, where one of the materials is thermosetting, the temperatures normally utilised for injection moulding of that thermosetting material. Thus where both the synthetic resin materials are thermoplastics that are solidified by cooling, the mould walls are preferably maintained at a temperature below the softening point of the skin material e.g. at a temperature in the range 0° to 100°C by water or oil circulating within the mould members defining the mould cavity. Where one or both of the synthetic resin materials are thermosetting i.e., materials that are converted to the solidified state by heating, the mould walls are preferably heated to the temperature necessary to effect solidification of the thermosetting resin.

Except where the skin material is thermoplastic and the core thermosetting in which case a heated mould would be utilised to effect curing of the core material, on injection of synthetic resin material into the mould cavity, the material adjacent to the walls solidifies before that in the centre of the cavity. As the material is injected into the mould cavity, it contacts the mould wall and then spreads out from the injection orifice, herein termed the sprue passage, towards the mould extremities. Thus while material is beiing injected, the melt front is continuously moving until it is halted by contact with the mould wall. We have noticed that if the melt front temporarily stops moving before the mould cavity is filled, a line may appear on the surface of the moulded article at a point corresponding to the position of the melt front when it was temporarily halted. This line is believed to be caused by preferential solidification of the melt at the point where the melt front is stationary. Some materials exhibit this line, herein termed a hesitation mark, to a greater extent than other materials.

During the injection cycle it is necessary to inject different materials, i.e., the skin material and then the core material, and so it is necessary to switch from injection of one material to another. While it is possible to arrange that the switchover is very rapid nevertheless a hesitation mark is still liable to occur.

In some cases it may be possible to arrange that injection is continuous, for example by arranging plugs of the materials to be injected in series in an injection barrel of an injection moulding machine. While this may avoid hesitation marks, it is less versatile than systems using separate injection barrels as the same injection conditions, e.g. temperatures, have to be used for each material and also contamination of the skin material by core material is possible.

In our British Pat. No. 1,291,111 we described a shuttle valve system which enabled injection of the second material to commence before injection of the first material stopped. By arranging for this "overlap" of injection the hesitation marks can be reduced or eliminated. We have now devised an alternative form of such a valve.

Accordingly we provide an injection unit of an injection moulding machine, for injecting plastic materials sequentially into a mould cavity with injection of the second material commencing before completion of injection of the first material, comprising 1. two injection barrels,
2. a single channel for connection with a sprue passage of a mould cavity,
3. ducts connecting each injection barrel with the single channel,
4. means to force plastic material from each barrel into the mould cavity via said ducts, channel, and sprue passage,
5. isolator means to isolate both injection barrels from the sprue passage at the same time, and
6. selector means having dispositions wherein each barrel in turn is connected to the single channel with the other barrel isolated therefrom, and in the transitional disposition of said selectror means, between said dispositions wherein one barrel is connected to the single channel and the other barrel is isolated therefrom, both barrels are connected to the single channel, characterised in that said selector means is located at the junction of said ducts and said single channel and comprises a. a passage each end of which connects to one of said ducts,
b. an opening in the wall of the passage, intermediate said ends, connecting with said single channel, the width of said opening being less than the width of said passage,
c. a shuttle mounted in said passage and being moveable, under the action of the pressure exerted by the plastic material, along the length of the passage, said shuttle blocking the passage, at each extremity of its movement, to prevent flow of material from the duct at that end of the passage, via the passage, to the opening, said shuttle at no time completely blocking said opening so that at any position of the shuttle, one or both of the ducts is connected to the opening.

The shuttle is thus of such a configuration that, if it has a part of the same cross-section as the passage, the length of that part, in the direction of movement of the shuttle, is less than the greatest dimension of said opening in the direction of movement of the shuttle.

The shuttle is preferably a ball and the passage is of circular cross-section having the same diameter as the ball. Alternatively short cylindrical shuttles can be used, or shuttles of other cross-sections. The shuttle preferably has a distance of travel greater than, or equal to, the greatest dimension of the opening in the direction of movement of the shuttle.

In operation, when one material is being injected, the injection pressure of that material emerging into the passage from the duct at one end thereof forces the shuttle to its extremity of its travel on the side of he opening in the passage remote from said one end. In this position the shuttle seals or isolates the other duct from communication with the opening.

When injection of material from the first barrel is nearing completion, the pressure on the material in the second barrel is increased. The shuttle is thus forced to move towards the other end of the passage, thus connecting the duct from the second barrel to the opening. As the shuttle at no time completely blocks the opening, material can thus flow from both injection barrels, via their associated ducts into the passage and hence into the mould. When the shuttle reaches the other extremity of its travel the duct from the first barrel is isolated from the opening, thus stopping flow of material from the first barrel.

The isolator means may be either upstream or downstream of the shuttle selector valve. It is preferably upstream of the shuttle selector valve so that both of the injection barrels can be isolated from the passage in the shuttle selector valve. This enables both injection barrels to be recharged with plastics material independently of each other.

In a preferred form the isolator is a rotary tap and particularly is a tap arranged both upstream and downstream of the shuttle selector valve. This may be achieved by locating the shuttle selector valve inside the spigot of a rotary tap. Such a tap spigot has two inlets one for communication with each duct, and a single outlet, which corresponds to aforesaid single channel, for communication with the sprue passage. On rotation of the spigot from the "on" position, the spigot inlets are taken out of communication with the ducts, thereby isolating each barrel from the sprue passage and from each other, upstream of the shuttle selector valve, and also the outlet of the spigot is taken out of communication with the sprue passage.

One embodiment of the invention is now described with reference to the accompanying drawings wherein FIG. 1 is a diagrammatic layout of the apparatus, FIG. 2 is a partial cross-section through the tap part of the injection unit showing the shuttle at one extremity of its travel;

FIG. 5 is a section along the line V—V of FIG. 4 with the shuttle omitted; and

Figure 2:
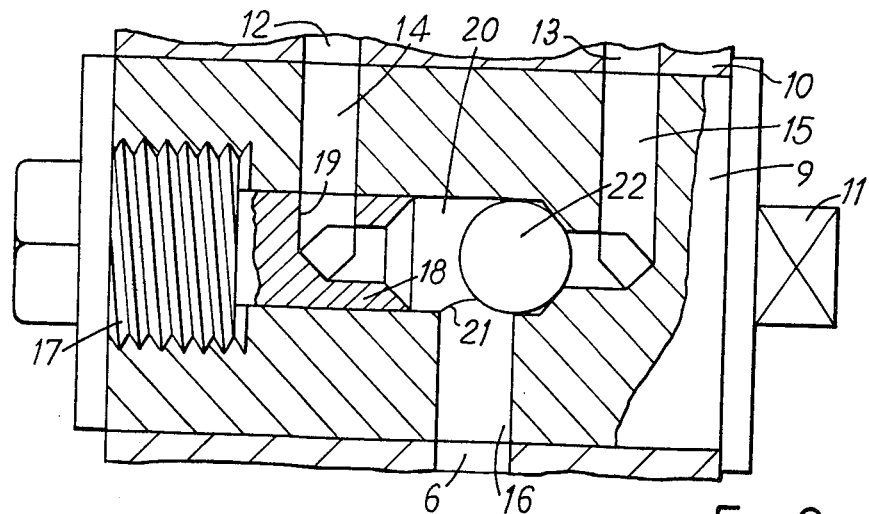

In FIG. 1 there is shown an injection unit comprising two injection barrels 1, 2 each provided with reciprocating screw injection rams which can be rotatably driven by motors 3 and reciprocated by hydraulic cylinders 4. The outlets of the injection barrels are connected via a tap 5 to a sprue passage 6 of a mould assembly 7. The tap 5 can be rotated between "on" and "off" positions by means of a motor 8.

Figure 3:
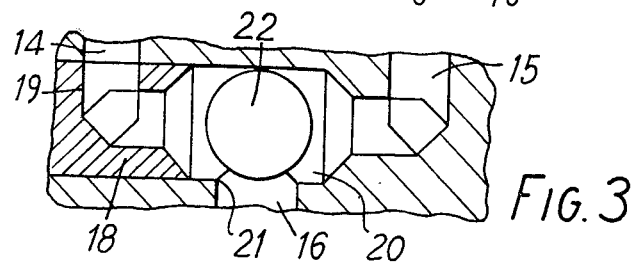
FIG. 3 is a view corresponding to part of FIG. 2 showing the shuttle in mid-position.
Figure 4:
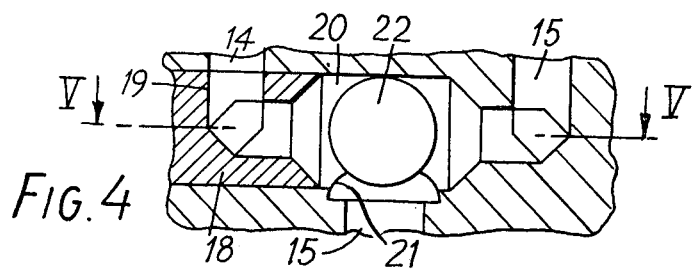
FIG. 4 is a view similar to FIG. 3 but showing an enlarged opening in the shuttle passage.

The tap arrangement is shown in more detail in FIGS. 2 to 4.

Referring to FIGS. 2 and 3 the rotary tap 5 comprises a rotatable spigot 9 mounted in a housing 10. A squared projection 11 on one end of spigot 9 enables the spigot to be rotated by the drive motor 8.

The two outlets from the injection barrels 1, 2 are shown as hot runners 12, 13. The housing 10 also provides the start of the sprue passage 6. The tap spigot 9 is provided with inlet ducts 14, 15 and a single cylindrical outlet channel 16. In the "on" position shown in FIG. 2 each inlet duct 14, 15 is connected to its associated hot runner 12, 13 respectively, and the outlet channel 16 is connected to sprue passage 6. On rotation of spigot 9 by means of motor 8 driving squared projection 11, the ducts 14, 15 and channel 16 can be moved out of communication with hot runners 12, 13 and sprue passage 6 respectively, thus constituting an "off" position wherein both injection barrels are isolated from each other and from the sprue passage 6.

Inside spigot 9, duct 15 leads into one end of a cylindrical bore disposed with its longitudinal axis along the axis of rotation of spigot 9.

A plug 17 is screwed into an enlargement of the cylindrical bore and this plug 17 has a cylindrical projection 18 which fits inside the bore. Duct 14 connects with a duct 19 in projection 18 and thence with a cylindrical passage 20 formed by the plugged cylindrical bore. This passage 20 has an opening 21 disposed in the wall thereof which opening forms the start of channel 16. The diameter of opening 21 and channel 16 is less han the diameter of passage 20. It is thus seen that passage 20 connects duct 15 with duct 14 via the duct 19 which forms an extension of duct 14.

Situated in passage 20 is a shuttle consisting of a ball 22. This ball has the same diameter as passage 20 and is movable therealong. By virtue of the fact that the shuttle is here a sphere, the length of the shuttle, in the direction of movement thereof, that has the cross-section of passage 20 is the thickness of the circumference and so is actually of infinitesimal length.

This length is thus less than the greatest dimension of opening 21, i.e., the diameter thereof, in the direction of movement of the shuttle. At each end of its movement, the ball seats against a tapered surface constituting the junctions of ducts 15 and 19 with passage 20. At one extremity of the movement of ball 22 (as shown in FIG. 2), its centre line, and hence the circumference in contact with the walls of passage 20, lies at one side of opening 21 while at the other extremity of movement, it lies to the other side of opening 21.

In the extreme position, as shown in FIG. 2, material can be injected from hot runner 12 to sprue passage 6 via, in turn, duct 14, duct 19, passage 20 and channel 16. At the same time the pressure on the material being injected forces ball 22 firmly against the tapered seating surface, thus isolating duct 15 from passage 20 and hence hot runner 13 from sprue passage 6.

In the transitional position as the ball moves from one extremity of movement to the other, as shown in FIG. 3, both duct 19 and duct 15 are in communication with passage 20 and because ball 22 can at no time block opening 21, material can flow from both hot runners 12 and 13 to the sprue passage 6.

The ball 22 is moved from one position to the other by the pressure exerted thereupon by the plastic material. When the injection of material from hot runner 12 is nearing completion (i.e., with the shuttle in the FIG. 2 position), the pressure on the material in the other injection barrel, and hence in hot runner 13, is increased. Because the whole of the cross-sectional area of the ball 22 is subjected to the pressure of the material in passage 20, while the area of the ball subjected to the pressure of material in duct 15 is somewhat less, due to the diameter of seating of the ball being less than the diameter of passage 20, the material in duct 15 has to be subjected to a higher pressure than that prevailing in passage 20 before the ball 22 will start to move. As the ball moves, material will be forced into the sprue passage 6 from both hot runners. When the injection ram in the injection barrel 2 connected to hot runner 12 stops moving forward the applied pressure will drop and ball 22 will seat against the tapered end of projection 18, thus isolating hot runner 12 from the sprue passage 6.

If it is desired to have a greater degree of overlap of injection, opening 21 may be enlarged in the direction of movement of the shuttle (although the width of the opening 21, i.e., in the direction perpendicular to the direction of movement, must remain less than the diameter of passage 20 to stop ball 22 dropping into the opening 21). Such an enlargement is shown in FIGS. 4 and 5.

Another advantage of this arrangement we have found is that the second injected material tends to be injected fairly concentrically down the sprue passage and hence the mould cavity is filled evenly.

Figure 6:
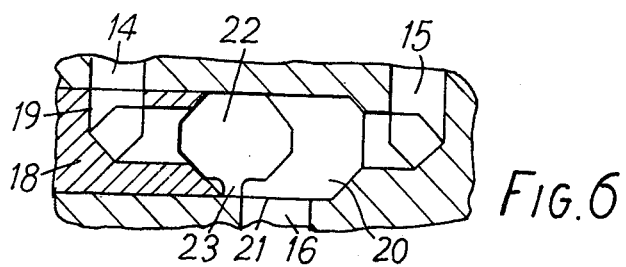
FIG. 6 is a view, similar to FIG. 3 but showing an alternative form of shuttle at one extremity of its movement.

Instead of a ball shuttle, alternative forms may be used. One of these is shown in FIG. 6. Here the passage 20 is of rectangular cross-section and the shuttle 22 has a middle portion 23 of corresponding rectangular cross-section. The length of this middle portion is less than the longitudinal dimension of the opening 21 so that shuttle 22 does not close opening 21 during its path of movement. The remainder of the length of shuttle 22 is of lesser cross-section and the ends are tapered to seat against the tapered ends of passage 20.

The sequence of operation of the apparatus of the present invention will generaly be as follows, referring to the apparatus of FIGS. 1 to 3 with the tap spigot in the "off" position, the mould cavity 7 is closed, the injection barrels 1, 2 are charged with plasticised plastics material by screw plasticisation in the normal way and the 'skin' material injection barrel 1 (connected to hot runner 12) pressurised. The tap is then turned to the "on" position and the skin material injection ram forced forwards by its associated hydraulic cylinder 4. The pressure of the material in hot runner 12 forces ball 22 to the FIG. 2 position, if it was not there already, and skin material is injected, via sprue passage 6, into the mould cavity. When injection of skin material is nearly complete, the core material injection ram in the injection barrel 2 connected to hot runner 13 is forced forwards; this pressurises the material in duct 15 until ball 22 starts to move. Injection of skin material continues meanwhile and injection of core material commences as soon as ball 22 is moved clear of the seating at the end of passage 20. Movement of the skin material injection ram is halted and the pressure exerted on ball 22 by the core material from duct 15 causes the ball 22 to seat against the tapered end of projection 18, thus stopping injection of skin material. Often, when injection of core material is nearly complete, the skin material injection ram is forced forward to repressurise the skin material in duct 19 and move ball 22 back to the FIG. 2 position as the core material ram is halted, thus injecting a further amount of skin material. The tap is then rotated to the "off" position, the moulding allowed to solidify and the injection rams recharged with plasticised material. After solidification the moulding is removed from the mould cavity, together with the sprue formed in sprue passage 6 and the system is then in readiness for the next moulding cycle.

The further injection of skin material enables any residual core material to be swept from the channel 16, so that on commencing injection of skin material in the next moulding cycle, no core material is present in channel 16, which being inside the tap spigot cannot be removed with the sprue, and so contamination of the skin injection in the next moulding cycle is avoided. It also ensures that the shuttle 22 is moved to the FIG. 2 position in readiness for the next moulding cycle.

It will be appreciated that if the length of travel of the shuttle is increased, the shuttle may lift off its seating before opening 21 is brought into communication with the portion of passage 20 between the previously isolated duct and the shuttle. In this case no injection of material from that previously isolated duct will occur until the shuttle moves sufficiently to permit communication between that duct and opening 21.

I claim:

1. An injection unit of an injection moulding machine, for injecting plastics material sequentially into a mould cavity with injection of the second material commencing before completion of injection of the first material, comprising
    a. two injection barrels;
    b. ducts connecting with each injection barrel;
    c. a passage, each end of which connects to one of said ducts, said passage having an opening in its wall, intermediate said ends, the width of said opening being less than the width of said passage;
    d. a single channel for connection of said opening with a sprue passage of a mould cavity;
    e. means to force plastics material from each barrel into the mould cavity via said ducts, passage, channel and sprue passage;
    f. isolator means, having an on-position for communicating the single channel with the injection barrels and an off-position wherein both injection barrels are isolated from the single channel at a location upstream of said passage; and
    g. a shuttle located in said passage and being moveable, under the action of the pressure exerted by the plastics material, along the length of the passage, said shuttle having a cross-section substantially the same as the passage and at each extremity of its movement blocking the duct at that end of the passage to prevent flow of material from that duct to the single channel, and said shuttle at no time completely blocks said opening so that, when the isolator means is in the on-position, depending on the position of the shuttle, one or other or both of the injection barrels are connected to the single channel via said ducts, passage and opening.

2. An injection unit as claimed in claim 1 wherein the passage is of circular cross section and the shuttle comprises a ball of the same diameter as said passage.

3. An injection unit as claimed in claim 1 wherein the shuttle has a distance of travel at least equal to the greatest dimension of the opening in the direction of movement of the shuttle.

4. An injection unit as claimed in claim 1 wherein the isolator means, when in the off-position, also isolates the single channel from the sprue passage.

5. An injection unit as claimed in claim 4 wherein the isolator means is a rotary tap and the passage and shuttle are located inside the spigot of the tap.

* * * * *